Figure 1:
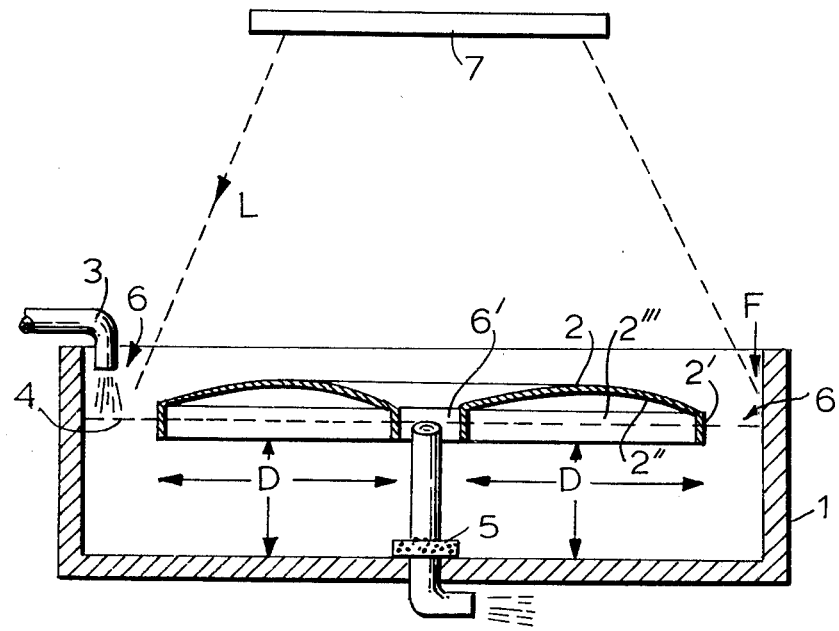

United States Patent [19]

Knowles

[11] 4,271,788
[45] Jun. 9, 1981

[54] PROCESS AND APPARATUS FOR ACCELERATING GROWTH RATE OF SALMONOIDS AND OTHER FISH AND THE LIKE

[75] Inventor: Albert H. Knowles, Inverness-shire, Scotland

[73] Assignee: Robert Harvey Rines, Concord, N.H.; a part interest

[21] Appl. No.: 65,617

[22] Filed: Aug. 10, 1979

[30] Foreign Application Priority Data

Jul. 17, 1979 [GB] United Kingdom ............... 24914/79

[51] Int. Cl.³ .............................................. A01K 63/00
[52] U.S. Cl. ........................................................ 119/3
[58] Field of Search .................................. 119/3, 2, 4

[56] References Cited

U.S. PATENT DOCUMENTS

| | | | |
|---|---|---|---|
| 2,944,513 | 7/1960 | Keely | 119/3 |
| 3,320,928 | 5/1967 | Smith | 119/3 |
| 3,572,291 | 3/1971 | Cavanagh | 119/3 |
| 3,626,901 | 12/1971 | Englesson | 119/3 |
| 3,698,359 | 10/1972 | Fremont | 119/3 |
| 3,884,186 | 5/1975 | Hickey | 119/3 |

Primary Examiner—Hugh R. Chamblee
Attorney, Agent, or Firm—Rines and Rines, Shapiro and Shapiro

[57] ABSTRACT

This disclosure is concerned with accelerating the growth rate of dense populations of salmonoids and other fish of related characteristics in ponds and the like by providing a light-blocked cover-shielded area over a substantial portion of the pond under which the fish can rest in darkness, with surrounding illuminated areas for visual feeding, and preferably with extended periods of illumination during continued feeding up to 24 hours, continuously.

28 Claims, 3 Drawing Figures

PROCESS AND APPARATUS FOR ACCELERATING GROWTH RATE OF SALMONOIDS AND OTHER FISH AND THE LIKE

The present invention relates to processes and apparatus for growing fish and the like, as of the salmonoid and other varieties of similar life-cycle development, being more particularly, though not exclusively, directed to processes for the rapid growth of the newly hatched fish into sufficiently relatively large size to permit the releasing of the same in the sea or other relatively large water body for normal subsequent growth, either in free release or in fish farms and similar environments.

Considering, by way of an important illustration, the application of the invention to salmon growth, the art is replete within the more current years, with various techniques for nurturing and growing the infant fish from the fry and parr stages to the smolt size and age, at which time they turn silvery in color and are ready for release in the sea, for example, or in sea ponds, for normal maturation. The more successful techniques adopted for this process include rather critical temperature control—warming to and maintaining water temperature at about 15° C., which requires energy consumption, the necessity for the heating equipment and its maintenance, and places limitations on the site suitable for the enterprise. To such systems it has been proposed to add lighting in the hope of increasing the time of feeding of the parr such as to accelerate this growth over normal day and night cycles; but results have ranged from inconclusive to questionable improvement, particularly when viewed from energy consumption requirements.

Underlying the present invention are a series of discoveries that have created a substantial breakthrough in acceleration of parr and smolt growth rate and uniformity of results, and have obviated the necessity for water heating and the attendant costs, (though, if desired, heating may be employed as a supplement); the invention having as its primary object, accordingly, the providing of a new and improved process and apparatus for growing salmon and the like (and, as later explained, other salmonoids and similar fish) that shall not be subject to the above-described and other disadvantages of prior techniques and apparatus, but that remarkably accelerate growth and with simpler, less costly equipment and operational steps.

Another object is to provide such a novel process and apparatus that are more generally useful in the growth and/or maintenance of other types of water-based creatures, as well.

Other further objects will be explained hereinafter, being more particularly delineated in the appended claims. In summary, however, from one of its important aspects, the invention embraces a process of accelerating fish growth rate, that comprises, densely populating a pond with fish; continually passing water into and from the pond; blocking external light from entering a substantial area of the surface of the water of the pond to provide an area shielded from light under which the fish can rest in darkness; and illuminating a region of the surface of the pond beyond and surrounding the said substantial area for enabling visual feeding by the fish at such region. Preferred details are hereinafter set forth.

Figure 2:
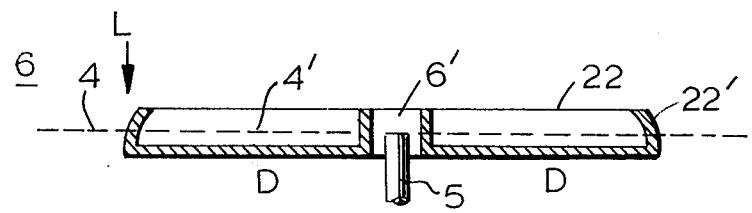
Figure 3:
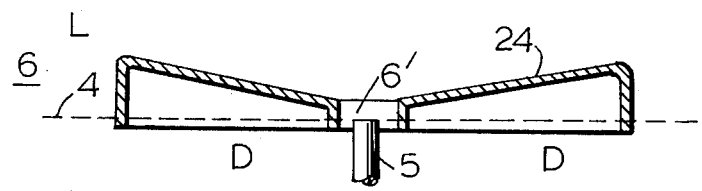

The invention will now be described with reference to the accompanying drawings in which FIG. 1 is a longitudinal sectional view, partly shaded, of a preferred apparatus for practicing the process of the invention; and FIGS. 2 and 3 are similar sections of modifications.

Referring to FIG. 1, a pond 1, illustratively shown as of circular contour, is fed with circulatory fresh water at 3, as from available natural environment supplies absent temperature control, with the water exiting through a central filter strainer 5, shown in cylindrical form for avoiding clogging and the necessity for cleaning. The term pond is herein employed in a general sense to embrace any water-holding volume.

Within the invention is the discovery that if the salmon parr, for example, can be provided with a sufficiently large cover or shield area of the pond in which the fish, when within that area, are completely shielded from all external light—direct, indirect and refracted—rather startling results occur in the relaxed status of the fish and their feeding habits. For the phenomenon to be produced, however, there must be a substantially complete blocking of all external light, including the inability of the fish to see light within the area even by refraction laterally outward. All angles of light vision by the fish must be prevented as by the shield lip (or cover) contacting with the water to generate the shadow area that is required for the effect of the invention to be fully produced. A lighted external region is also required where the fish can see food and can dart radially beyond the cover to procure the same and return to the dark area.

The structure of FIG. 1 attains this result by providing an inverted opaque cover-shield cup 2, as of fiberglass, floating on the surface of the water 4, with the downwardly extending peripheral lip 2' within the water, and preferably an air layer 2''' within the cover shield 2 for purposes of preventing contact with the water that would otherwise make deposits on the undersurface 2'' of the shield and require periodic cleaning. Fish under the cover shield 2 cannot see external light under the cover from above or even by refraction laterally inward, so that a dark area is provided. If the lip 2' were not in contact with the water, but were above, (or if a flat or other shield were above the water and not in contact with the water, or absent a lip to contact the water) lateral light would enter, preventing this substantially totally dark or shadow area D so essential to this phenomenon underlying the invention.

It has been discovered that the usual nervous character of fish, particularly when in dense populations in restricted areas, in response to noises, vibration, people walking by, birds, rapid light changes, and other sudden environmental variations, that limit the feeding performance of the fish, are startingly obviated by the above type of cover-shield apparatus. Agitated parr, for example, generate excess lactic acids which may take a couple of hours to dissipate, with the period of time required for quieting and dropping of acid level and the like being lost for feeding. With the cover shield 2, as above described, with its lip or itself in contact with the water, however, even dense populations of the fish rest in the apparent security of the dark area D thereunder. With the only illuminated pond regions restricted to zones external to the shielded area D, they are then employable as the feeding zones, shown as the exteriorly surrounding peripheral illuminated annular region 6 and the interiorly surrounding central annular region 6'; and these have been found to enable the fish to dart radially outwardly or inwardly from the shielded zone, respectively, to grab feed and return to dark security under the cover shield 2. The fish feed may be periodically dropped into region 6 (and 6', if desired) automatically as is well known and schematically illustrated at F, such as by solenoid shutter control, and with the feed beneficially held at the surface for relatively long periods of time as the water circulates around region 6 as a result of the increased surface tension or suction-like force or effect produced by the contacting of the cover shield with the water—this, as distinguished from the rather rapid dropping to the bottom and thus wasting of feed absent such shield contact with the water surface.

Such operation, furthermore, has been found to reduce to substantially zero, the disfigurement, agression and eye-nibbling heretofore encountered in dense populations, and has, indeed, permitted as much as fifty percent density level increase over open ponds or tented or similar covered ponds of the prior art that lack the complete and substantial light-shield area in the water of the present invention, surrounded by the illuminated feed zone(s). As an example, normally during winter in latitudes such as northern Scotland, eight-foot smolting ponds have carried 2000 parr. With the invention, the density can be increased to 3000 fish with no deaths or disfigurements observed during the total growth of smolts.

As will later be more particularly delineated, the increased feeding resulting from this construction and operation has produced a significantly faster growth rate of the parr, which is even pronounced in the cold water of winter months of northern Scotland (though not as spectacular as in the warmer water of summer). Particularly with a combination of some winter (or cold) and summer (or warm) months, as later explained, faster growth rates can be attained without resort to water-heating equipment and the costs which are considerable in trying to maintain, for example, 15 gallons of water per minute, for example, at 15° C. in mid-winter.

While it has heretofore been proposed artificially to illuminate ponds, the same problems of agitation still exist. Under twenty-four hours of light, furthermore, the fish tire and cannot hide or rest. The stress of such prolonged illumination may obviate any significant improvement in feeding in many cases. With twenty-four hour (or other extended) illumination L on a continuous basis throughout the smolt generation in the feed regions 6 and 6' added to the cover-shield security system of FIG. 1, however, as by fluorescent lamps 7, even a greater improvement in growth rate has been discovered, and, of course, absent the agitation, stress and tiring problems inherent in prior long-period illumination systems. As later more fully documented, for example, even in winter months, very significant growth rate increases can be attained over just daylight operation of the cover-shield system.

It has further been found that even if the inside bottom (and, if desired, the sides) of the pond are light colored, such as pale green, the use of the 24-hour lighting produces substantial stress on the fish in an unshielded pond, causing them to experience vulnerability against the light bottom. By lightening the bottom (and, if desired, the sides) of the pond having the cover-shield system of FIG. 1, however, such stress is not only obviated, but the feeding regions are more visible to the sight feeders. As later detailed, accordingly, an even greater growth rate occurs than with cover-shielded 24-hour lighted ponds with black bottoms.

Successful results have been obtained in, for example, eight-foot ponds with a 6-foot diameter planar shield and a peripheral feed region 4 about one foot wide, such that the major portion of the surface of the water in the pond is shielded, but with an annular peripheral open illuminated feeding ring 6. Struts or wires, not shown, may hold the cover in position. To avoid fish jumping upon the top of the shield cover, the lip 2' may merge into the inclined convex doming of the cover-shield to assist in tumbling the fish back. In the embodiment of FIG. 2, the cup-shield 22 is inverted and may internally contain water, as at 4', for any such adventuresome fish, though the lip 22' may be inclined somewhat inwardly to provide a fall-back surface. And in the system of FIG. 3, which may be better suited for large ponds, the somewhat concave shaping of the cover shield 24 may serve a similar function; all of the embodiments of FIGS. 1 through 3 providing the necessary cover shield characteristics before discussed. The results desired can also be obtained by immersing the cover shield in the water, as in the system of FIG. 2 or otherwise, and these types of constructions can be used also in larger fish cages and the salt-water ponds themselves, as well. Fish jumping can be obviated, also, by annular covers over the annular feeding regions 6 and 6', preferably transparent as of polystyrene or the like for illumination and viewing, such as from the rim of the cover 2 to the walls of the pond over region 6, and which, with the cover shield, also beneficially quiets and closes off the pond from the external environment around the pond; and/or trap doors can be provided in the cover proper for inspection, if desired.

In a first set of experiments in eight-foot diameter open ponds employing salmon parr from the same parentage and of length greater than about five, but less then six, centimeters, and in groups of three thousand, it was found that over 70% of the group fed with the cover shield of the invention had grown to over eight centimeters in length in a four-month period over the summer months and into the fall, as contrasted with only 10% of such size in a group without the cover shield.

In further experiments, three thousand parr lots were similarly fed in ponds during a period of two winter months (Scotland), with average unheated water temperature of 6.5° C., and with the cover-shield pond subjected to continuous 24 hour operation of artificial light L under a tent, while an uncovered control pond was subjected to ordinary daylight and night-time cycles. The resulting increased feeding and more favorable environmental conditions of the former installation, demonstrated about two and a half times the number of parr that had grown larger than 7 centimeters, as compared with the number produced by the uncovered daylight feeding of the latter installation.

The last-named tests were performed with ponds the bottoms of which were of dark color. Simultaneous testing under the same conditions with a pond provided with the cover shield of the invention and the 24-hour lighting, but with a light-colored bottom (in this case, pale green), produced about two and a third times more parr of greater than 7 centimeters length than the covered pond with the 24-hour lighting, and almost six times the number of parr of such size produced by the uncovered daylight pond with a black bottom. In addition, the largest parr in the case of the cover-shield ponds were ten centimeters—a length attained by none of the parr in the uncovered pond.

Turning, now, to tests continued into the coldest winter months (December and January) without water heating, and with an average temperature just above freezing (0.5° C.), the above-mentioned uncovered daylight pond showed no apparent further growth in the parr; whereas the cover-shield ponds of the invention with the 24-hour lighting, showed continued, though slower growth, with the largest fish reaching 11 centimeters by mid-January.

In a six-week period of the late spring and early summer (May through mid-June), substantially all the parr (in excess of 20,000 fish) in ponds equipped with the cover-shield of the invention, with an average water temperature of 10° C., showed at least three centimeters of growth. This enabled the smolt stage to be reached at least a month and a half before such is reached with prior art techniques, such that the smolt can be brought to sea (or sea ponds), earlier, with resulting full-size salmon marketing in the early winter when the highest price can be attained.

As still another experiment, the ponds were disposed in a shed under continuous fluorescent light (though other tests with incandescent lights also proved successful) in the period from the end of December to the latter part of May and with the cover-shield of the invention. Smolting occurred for substantially one hundred percent of the fish by May 25th, with the fish 13.5 centimeters in average length and with an average weight of 26 grams—this being attained at least two months earlier than with prior techniques. Again, this earlier availability for sea-water growth enables a longer period of summer-temperature sea-water growth (doubling weight every month in the sea), providing faster full-size commercial fish within a year and a half, which can bring the salmon to market in January or February, for example, before the runs of natural salmon and at a time when the price is higher.

Test results further show that the smolt grown in unheated ponds, in accordance with the invention, do not have the temperature acclimation problems of smolt raised in heated ponds when released in the sea or sea ponds of colder temperature, and thus have been found to grow significantly faster in the sea water. Specifically, two batches of 1000 smolt of 26 grams average weight, one grown under the conditions of the invention, and the other by standard prior art techniques before described, were transferred to sea-water ponds, with the former batch received in a sea-water pond having the opaque cover shield of the invention. In an approximately one-month period from the latter part of May to the latter part of June, and with the covered pond receiving the 24-hour illumination over the last two thirds of that time period only, the salmon smolts treated by the techniques of the invention more than doubled in weight (average 56 grams), whereas the other batch did not quite achieve two times weight gain (average 47 grams).

As still a further example, this time in the fresh water development of salmon fry, strikingly illustrating that 24-hour light conditions alone cannot begin to produce the results attained when combined with the cover-shield technique of the invention, from mid-May to the end of June (again in northern Scotland), the latter batch achieved a weight more than two-thirds greater than the former.

The process and apparatus of the invention thus appear to produce at least the following advantages over unshielded daylight pond breeding:

1. a minimum of a twenty-five percent greater weight gain;
2. greater densities of fish can be employed in the ponds without agressive or harrassment action and maimed or killed fish;
3. grading can effectively take place more often, such as every month;
4. a shorter period is required to attain smolts, so that they can get to sea water earlier—ie. larger and earlier smolts, and lesser periods of sea water pumping;
5. heating equipment and costs not required;
6. bring mature fish to market at an earlier time of year.

Through the control of the degree of illumination, in combination with the cover-shield construction, moreover, the invention enables control of the smolt growth rate—permitting slow-down and speed-up, and thus the timing of the full smolt development. The result is the achievement of smolt development at controlled times and in faster time periods, providing full-grown smolt earlier than by prior techniques which tends to prevent expending of energy by older smolt in gonad development and thus obviates the need for steroid or gamma-ray techniques for inhibiting such energy dissipation.

If it is desired to attain only the degree of growth rate acceleration and other advantages of the cover-shield portion of the invention, this, of course, may be done without the added advantages of the extended lighting or light-colored ponds in combination therewith; and other combinations and permutations of the same may be used, including even with heated water systems, if desired. While the invention has been illustratively described with reference to the important field of salmon, clearly the process and apparatus are most suitable for other salmonoids, including char and trout. While most useful with the baby fish, moreover, the invention may equally be applied to aid the growth rate of the larger fish, as well, and of other types of fish with similar or related growing cycles, where the term "fish" is herein used in the specification and claims in a generic sense, also embracing, for example, eels, crustacea, etc.

Further modifications will also occur to those skilled in this art, and such are considered to fall within the spirit and scope of the invention as defined in the appended claims.

What is claimed is:

1. A process of accelerating fish growth rate, that comprises, densely populating a pond with fish, the pond comprising a volume of water contained within boundaries; continually passing water through the pond; providing in contact with the water an opaque cover shield that is positioned relative to adjacent boundaries of the pond so as to cover a substantial area of the pond, so as to block external light from entering that area, and so as to provide a region beneath the cover shield directly and laterally shielded from light; maintaining said region as a dark region in which the fish can rest in darkness; and illuminating a region of the pond beyond said dark region for enabling visual feeding by the fish at the illuminated region.

2. A process as claimed in claim 1 and in which said substantial area occupies the major portion of the surface of the water in the pond.

3. A process as claimed in claim 1 and in which the internal bottom and/or sides of the pond are light-colored.

4. A process as claimed in claim 1 and in which the surface of the pond is continuously illuminated for periods longer than daylight hours, continuing the feeding through said periods.

5. A process as claimed in claim 4 and in which the pond is illuminated for substantially 24-hour periods.

6. A process as claimed in claim 1 and in which said fish are salmonoids.

7. A process as claimed in claim 6 and in which the said fish are salmon fry and/or parr, and the said process is carried out during cold and warm months until smolting.

8. A process as claimed in claim 1 and in which said fish are infant fish and the said process is carried out during cold and warm months until the fish are of sufficient size for release into full-maturation areas.

9. A process as claimed in claim 1 and in which the water is at the natural environmental temperature in the vicinity of the pond.

10. A process as claimed in claim 1 and in which the water is heated above the natural environmental temperature in the vicinity of the pond.

11. A process as claimed in claim 1 and in which the light blocking and the illuminating are controlled to control the development of the fish; inhibiting or accelerating the growth, correspondingly to control the time of predetermined degree of development.

12. A process as claimed in claim 11 and in which the fish are fry or parr, and the control is effected to determine the time of smolting.

13. A process substantially as claimed in claim 1 and in which the said illuminated region is covered with a light-transparent covering.

14. A process as claimed in claim 1 in which the illuminated region includes a portion of the pond embraced by the dark region.

15. Fish growth acceleration apparatus having, in combination with a water-circulated pond in which a volume of water is contained within boundaries, blocking means including an opaque cover shield in contact with the water and positioned relative to adjacent boundaries of the pond for covering a substantial area of the pond, for blocking external light from entering that area, and for providing a region beneath the cover shield that is directly and laterally shielded from light and maintained as a dark region in which the fish can rest in darkness, and means for enabling visual feeding by the fish at an illuminated region beyond the dark region.

16. An apparatus as claimed in claim 15 and in which said illuminated region is covered with light-transparent cover means.

17. An apparatus as claimed in claim 16 and in which the pond is substantially closed to the external environment around the pond by the combination of the blocking means and light-transparent cover means extending from the blocking means to cover the feeding region therebeyond.

18. Apparatus as claimed in claim 15 and in which the illuminated region includes a portion of the pond embraced by the dark region.

19. Apparatus as claimed in claim 15 and in which said illuminated region peripherally surrounds said dark region.

20. Apparatus as claimed in claim 15 and in which said cover shield is inverted cup-shaped with the peripheral lip thereof within the water.

21. Apparatus as claimed in claim 20 and in which the inverted cup-shaped cover shield is floated upon the water with air between the water surface thereunder and its internal surface.

22. Apparatus as claimed in claim 15 and in which said cover shield is cup-shaped.

23. Apparatus as claimed in claim 15 and in which said cover shield is provided with means for preventing fish from jumping out and resting upon the top surface thereof.

24. Apparatus as claimed in claim 15 and in which said cover shield is substantially convexly dome-shaped.

25. Apparatus as claimed in claim 15 and in which said cover shield is substantially concavely shaped.

26. Apparatus as claimed in claim 15 and in which the internal bottom and/or sides of said pond are light-colored.

27. Apparatus as claimed in claim 15 and in which means is provided for illuminating the surface of the pond for periods longer than daylight hours.

28. Apparatus as claimed in claim 27 and in which said periods are substantially 24 hours.

* * * * *